(12) United States Patent
Simbuerger et al.

(10) Patent No.: US 9,295,268 B2
(45) Date of Patent: Mar. 29, 2016

(54) APPARATUS AND METHOD FOR PRODUCING AERATED CONFECTIONERY MASSES

(75) Inventors: Stephan Simbuerger, Munich (DE); Stephen Malcolm Pearson, Hohenbrunn (DE); Egidijus Bizys, Westmont, IL (US)

(73) Assignee: Kraft Foods R & D, Inc., Deerfield, IL (US)

( * ) Notice: Subject to any disclaimer, the term of this patent is extended or adjusted under 35 U.S.C. 154(b) by 0 days.

(21) Appl. No.: 13/166,172

(22) Filed: Jun. 22, 2011

(65) Prior Publication Data
US 2011/0311673 A1  Dec. 22, 2011

Related U.S. Application Data

(62) Division of application No. 11/721,456, filed as application No. PCT/EP2005/056928 on Dec. 19, 2005.

(30) Foreign Application Priority Data

Dec. 22, 2004  (EP) .................................. 04106891

(51) Int. Cl.
*A47G 19/14* (2006.01)
*A23C 3/04* (2006.01)
(Continued)

(52) U.S. Cl.
CPC ................ *A23G 3/0221* (2013.01); *A23G 1/52* (2013.01); *A23G 3/0012* (2013.01); *A23G 3/52* (2013.01); *A01J 25/008* (2013.01); *A47G 19/16* (2013.01)

(58) Field of Classification Search
CPC ...... A47G 19/16; A47J 31/4485; A47J 27/04; B67D 1/0057; A21C 9/063; A21C 15/00; A01J 25/008; A01J 25/114; A23N 7/005
USPC .......... 99/323, 323.1, 323.2, 450.6, 517, 455, 99/459, 473, 474
See application file for complete search history.

(56) References Cited

U.S. PATENT DOCUMENTS 2,594,442 A * 4/1952 Irwin ................................ 62/70
3,351,038 A * 11/1967 Miller et al. .................... 118/24
(Continued)

FOREIGN PATENT DOCUMENTS

EP  0 724 836 A2  8/1996
FR  2 616 043 A1  12/1988
(Continued)

OTHER PUBLICATIONS

International Search Report, International Patent Application PCT/EP2005/056928, date of actual completion of the search Feb. 24, 2006, 4 pages (corresponds to U.S. Appl. No. 11/721,456).
(Continued)

*Primary Examiner* — David Angwin
*Assistant Examiner* — Hemant Mathew
(74) *Attorney, Agent, or Firm* — Fitch, Even, Tabin & Flannery LLP (57) ABSTRACT

For producing an aerated confectionery mass, a raw confectionery mass is fed at a feed rate from a supply to an aeration unit for introducing gas into the confectionery mass and wherein the aerated confectionery mass is fed to a production line for the production of confectionery or tablets. The feed rate of the raw confectionery mass is controlled such that it corresponds to the demand of the production line, the amount of introduced gas is controlled in response to the feed rate of the confectionery mass so that the aeration level of the confectionery mass remains substantially constant and the temperature of the aeration mass within the aeration unit is controlled such that it remains substantially constant and independent from the feed rate. The aeration unit may include a rotor for stirring and kneading the confectionery mass containing the introduced gas, the rotational speed of the rotor being controlled such that it is enhanced for higher feed rates and reduced for lower feed rates in order to produce gas bubbles of approximately the same size independent from the feed rate. In order to keep the bubble size small during the depositing step, the depositing is realized via a pressurized manifold containing multiple nozzles.

18 Claims, 7 Drawing Sheets

(51) Int. Cl.
*A23G 3/02* (2006.01)
*A23G 1/52* (2006.01)
*A23G 3/34* (2006.01)
*A23G 3/52* (2006.01)
*A47G 19/16* (2006.01)
*A01J 25/00* (2006.01)

(56) References Cited

U.S. PATENT DOCUMENTS

| | | | |
|---|---|---|---|
| 4,273,793 | A | 6/1981 | Fariel et al. |
| 4,542,028 | A | 9/1985 | Butcher et al. |
| 5,484,614 | A | 1/1996 | Clem |
| 5,727,713 | A | 3/1998 | Kateman et al. |
| 5,758,571 | A * | 6/1998 | Kateman et al. ............... 99/455 |
| 5,868,065 | A * | 2/1999 | Haggerty et al. ............... 99/455 |
| 6,482,464 | B1 | 11/2002 | Asama et al. |
| 6,983,683 | B2 * | 1/2006 | Brown et al. ............... 99/323.1 |
| 2002/0176917 | A1 * | 11/2002 | Brown et al. ............... 426/474 |
| 2003/0142581 | A1 * | 7/2003 | Barton et al. ............... 366/142 |
| 2003/0224089 | A1 * | 12/2003 | Engesser et al. ............... 426/34 |
| 2006/0034976 | A1 * | 2/2006 | Cotten et al. ............... 426/103 |

FOREIGN PATENT DOCUMENTS

| | | | |
|---|---|---|---|
| FR | 2616043 A1 * | 12/1988 | |
| GB | 2 181 068 A | 4/1987 | |
| RU | 2013947 C1 | 6/1994 | |
| SU | 1741727 A1 | 6/1992 | |
| WO | 01/30174 A1 | 5/2001 | |
| WO | 01/67898 A1 | 9/2001 | |
| WO | 2004/056191 A1 | 7/2004 | |
| WO | WO 2004056191 A1 * | 7/2004 | |

OTHER PUBLICATIONS

International Preliminary Report on Patentability, International Patent Application PCT/EP2005/056928, date of completion of the report Mar. 23, 2007, 12 pages (corresponds to U.S. Appl. No. 11/721,456).
European Search Report, European Patent Application No. EP 04 10 6891, date of completion of the search May 19, 2005, 4 pages (corresponds to U.S. Appl. No. 11/721,456).
European Examination Report, European Patent Application No. EP 04 10 6891, May 19, 2008, 5 pages (corresponds to U.S. Appl. No. 11/721,456).
European Notice of Opposition and Statement of Facts and Arguments, European Patent Application No. EP 04 10 6891, Apr. 20, 2011, 31 pages (corresponds to U.S. Appl. No. 11/721,456).
Reply of Patent Proprietor to Notice of Opposition for EP 1835814, filed Nov. 29, 2011, 41 pages (corresponds to U.S. Appl. No. 11/721,456).
MB Whitworth et al., "The Imaging and Measurement of Bubbles in Bread Doughs." Bubbles in Food, edited by Grant M. Campbell et al., 1999, pp. 221-231.
J. Haedelt et al., "Bubble-Included Chocolate: Relating Structure with Sensory Response." Journal of Food Science, 2007, pp. E1-E5.
Letter re Opposition by Wm. Wrigley Jr. Company, European Patent No. 1835814 (05821770.4), dated Feb. 10, 2012, 4 pages.
Summons to Attend Oral Proceedings, European Patent No. 1835814 (05821770.4), dated Feb. 20, 2013, 5 pages.
Response of Patentee to Letter of Opponent filed Feb. 10, 2012 and in Response to Summons to Attend Oral Proceedings of Feb. 20, 2013, European Patent No. 1835814 (05821770.4), dated May 29, 2013, 33 pages.
Decision Rejecting the Opposition, European Patent No. 1835814 (05821770.4), dated Jul. 18, 2013, 12 pages.
Bernard W. Minifie, "Chocolate, Cocoa and Confectionary." Published by Van Nostrad Reinhold, 1989, Chapters 7, 11 and 19, pp. 183-226, 315-327, and 499-635.
Reg Groves, "Marshmallow Production: Technology and Techniques." Published in Proceedings of the 49th P.M.C.A. Production Conference, 1995, pp. 124-128.
Allan Aasted, "Adding Value to Tempering with Aeration and Flavors." The Manufacturing Confectioner, Apr. 2003, pp. 115-116.
Statement of Grounds and Particulars of Opposition, Australian Patent Application No. 2005318172, dated Mar. 6, 2013, 12 pages.
Letter from opponent's attorney providing part Evidence in Support of the Opposition with Statutory Declaration of (1) Dr. Tracey Ziener with annexures TZ-1 to TZ-9 and (2) Dr. Matthew Hogan with annexures MH-1 to MH-7, Opposition of Australian Patent Application No. 2005318172, dated Oct. 4, 2013, 392 pages.
Letter from opponent's attorney providing part Evidence in Support of the Opposition with Statutory Declaration of Michael Jansen with annexures MJ-1 and MJ-2, Opposition of Australian Patent Application No. 2005318172, dated Oct. 7, 2013, 33 pages.
Letter by Applicant re Evidence in Answer with Statutory Declaration of Janelle Suzanne Borham with Exhibits JSB-1 to JSB-11, Opposition of Australian Patent Application No. 2005318172, dated Jan. 7, 2014, 112 pages.
Letter re Opposition withdrawn, Opposition of Australian Patent Application No. 2005318172, dated Apr. 7, 2014, 1 page.

* cited by examiner

Fig. 7

APPARATUS AND METHOD FOR PRODUCING AERATED CONFECTIONERY MASSES

CROSS-REFERENCE TO RELATED APPLICATION

This application is a divisional of U.S. Application Ser. No. 11/721,456, filed Jun. 12, 2007, which is a national phase application of International Application No. PCT/EP2005/056928, filed Dec. 19, 2005, designating the United States and claiming priority to European Patent Application No. 04106891.7, filed Dec. 22, 2004, which are incorporated by reference herein in their entireties.

TECHNICAL FIELD

The invention relates to a method and an apparatus for producing an aerated confectionery mass and in particular a confectionery product. A raw confectionery mass is fed by a feed pump from a supply to an aeration unit wherein the confectionery mass is aerated by introducing gas bubbles into the mass. The aerated mass is then fed to a production line for the production of confectionery or micro-aerated massive tablets.

The confectionery mass is typically a chocolate mass but could also be a filling mass. The chocolate mass is supplied from a mass tank to a tempering unit. In the mass tank the chocolate mass is usually heated to about 45° C. in order to melt all crystals. The chocolate mass is cooled down in the tempering unit to about 25 to 26° C. and then reheated to about 29 to 31° C. in order to melt all crystal structures with exception of the β-structure. The apparatus comprises further a back-pressure regulating valve in an outlet conduit from the aeration unit for adjusting the pressure in the aeration-unit and a depositor hopper into which the aerated mass is fed from the back-pressure valve and from which the mass is dispensed to a downstream production line for manufacturing a desired product. If the product is a tablet it is preferred that the depositor hopper of the production line is replaced by a pressurized manifold comprising multiple nozzles.

BACKGROUND ART

WO 01/30174 discloses a confectionery aeration system of this type, wherein the depositor hopper includes a weir, to return excess chocolate to the mass tank or the tempering unit. Alternatively, the aerated confectionery mass can be re-circulated from the depositor hopper to the aeration unit and back to the depositor hopper and the depositor hopper includes a level probe which controls the supply of fresh confectionery mass via the tempering unit to the aeration unit.

EP 0 724 836 discloses a similar system wherein excess aerated confectionery mass is returned via a restriction valve to the tempering unit and the returned portion of the confectionery mass is de-aerated.

DISCLOSURE OF INVENTION

The problem underlying the invention resides in how to avoid the necessity of detempering, de-aeration and re-tempering of the returned portion of the confectionery mass.

This problem is solved according to the invention by controlling the feed rate with which the confectionery mass is fed to the aeration device such that it corresponds to the demand of the production line and cooling the confectionery mass within the aeration device such that the confectionery mass is not heated within the aeration device above a predetermined limit.

The invention makes thus available a one-pass process by which the desired aeration level is achieved in one go. The invention makes possible a continuous aeration operation without the necessity to return any portion of the confectionery mass. A larger amount of energy is saved thereby.

Because the confectionery mass is fed to the aeration device in accordance with the demand of the production line, no portion of the confectionery mass has to be returned. This means that the throughput of the aeration device varies and the heat developed within the aeration device is transferred to a varying amount of confectionery mass. It is therefore necessary to cool the confectionery mass within the aeration device in order to avoid overheating.

The process is carried out usually in such a way that the gas bubbles are rather small so that they are not visible. The gas bubbles can have a size of less than about 50 μm.

The aeration device comprises usually a stator and a rotor between which the confectionery mass and the gas, usually $N_2$ gas, are introduced. Shearing forces are developed by the rotation of the rotor and the gas bubbles are distributed by the shearing forces within the confectionery mass. The size of the gas bubbles depend on the magnitude of the shearing forces which in turn depend on the constructional details of the aeration device, in particular the distance between stator elements and the rotor elements, as well as on the rotational speed of the rotor. Preferably, the rotational speed of the rotor is controlled such that the bubble size is just below 50 μm The rotational speed is controlled to be not higher than necessary for producing gas bubbles of the desired size. The energy consumption is lowered thereby. In addition the confectionery mass is heated less with lower rotational speed so that less energy is consumed for cooling the mass.

As mentioned, the feed rate of the aeration device is controlled in response to the demand of the production line. A higher feed rate brings about a higher gas amount and a shorter dwelling time of the confectionery mass within the aeration device. In order to compensate for the shorter dwelling time, it is necessary to enhance the rotational speed of the rotor. Higher shearing forces are produced thereby so that the air bubbles are distributed uniformly within the confectionery mass and the bubble size is reduced. The rotational speed of the rotor is controlled in response to the flow rate in accordance with empirical values. The tendency, however, is that a higher flow rate makes necessary a higher rotational speed of the rotator.

Preferably, a back-pressure valve is installed in the outlet of the aeration device. The back-pressure produced by the back-pressure valve is the pressure prevailing in the aeration device. The feed pump operatively connected to the aeration device has to work against the back-pressure maintained by the back-pressure valve. The higher the back-pressure is the smaller are the bubbles produced by the aeration device. Preferably, the value of the back-pressure produced by the back-pressure valve is adjustable and the back-pressure value is controlled in response to the flow rate of the confectionery mass.

The confectionery mass is supplied from the outlet into a depositor hopper or preferably a pressurized manifold from which the aerated confectionery mass is conducted to a production line, e.g. moulds for forming the desired product. The depositor hopper includes a level indicator from which the signal indicating the demand of the production line is derived.

In case of depositing via a pressurized manifold the production line includes a speed indicator from which the demand of the production line is derived.

The pressurized manifold is in general commercially available and comprises multiple nozzles, e.g. 10 to 150 nozzles, through which the aerated mass is filled into moulds which are positioned on a moulding line. The pressure of preferably 3-4 bars is maintained until the mass leaves the nozzle. Usually the moulds are overfilled and the overfilled portion of the product is scraped off. Subsequently the moulds are transported to a vibration section and vibrated in order to better distribute the product in the mould. The product is then cooled to about 16° C. and demoulded. Due to the high viscosity of the mass and the reduced time between filling and solidifying of the mass, the small bubble size of the micro-aeration process may be maintained. A further advantage of the pressurized filling is that the mechanical stress on the mass can be minimized.

In the most preferred form the apparatus includes a cascade control, including the following steps:
controlling the feed pump operatively connected to the aeration device in response to the demand of the production line;
controlling the gas feed rate to be a predetermined percentage of the confectionery mass feed rate;
controlling the rotational speed of the rotor of the aeration device in response to the feed rate of the confectionery mass such that the size of the gas bubbles is below a predetermined level;
controlling the pressure within the aeration device in response to the confectionery mass feed rate;
controlling the cooling power such that the temperature of the confectionery mass is in the aeration device within a predetermined temperature range.

The rotational speed of the rotor, the pressure and the cooling power are controlled according to empirical tables by a control unit.

The parameters and the working principle are as follows for chocolate mass: The following parameters are entered into the control unit:
desired aeration level of chocolate mass (preferably online-density)
chocolate mass flow
gas flow
rotational speed of rotor
back pressure
chocolate temperature
   at the inlet of the aeration device
   at the outlet of the aeration device
temperature of cooling media Working principle: based on the demand of the downstream production line the aeration unit will either increase or decrease the throughput while ensuring required aeration level (e.g. 10%)

Increase of chocolate mass throughput:
amount of chocolate mass and gas flow will be adjusted accordingly to defined ratio resp. online density reading
increase of rotor speed
increase of back pressure, e.g. up to a maximum of 5-7 bar (if the confectionery mass is a filling mass the back pressure may be increased up to 16 bar)
control of temperature difference between inlet and outlet
in case of temperature increase of chocolate mass at the outlet decrease of the temperature of the cooling media to maintain initial difference
in case of still increasing chocolate outlet temperature while minimum temperature for cooling media is achieved, a decrease of rotor speed is required Decrease of chocolate mass throughput:
amount of chocolate mass and gas flow will be adjusted accordingly to defined ratio resp. online density reading
decrease of back pressure (minimum 3-4 bars)
decrease of rotor speed
control of temperature difference between inlet and outlet
in case of temperature increase of chocolate mass at outlet decrease of the temperature of the cooling media to maintain initial difference During continuous operation no portion of the mass will be returned from the aeration unit to the mass tank. The control unit controls the feed pump operatively connected to the aeration unit in order to increase or decrease the throughput of the aeration unit in accordance with the demand of the production device or line for forming the desired product.

Flow depending control of gas input, rotation speed of the rotor, back-pressure and the temperature of the aerated mass are the key working principle. Any flow variations of units operating down-stream of the aeration unit are balanced by the control unit. Back-pressure, gas input, rotation speed and temperature of the aerated mass are adjusted to ensure the desired aeration level independently of flow variations caused by units placed down-stream of the aeration unit.

The advantages obtained by the claimed invention are primarily reduced start-up time and avoidance of any recirculated masses, which would need to be de-tempered, de-aerated and re-tempered.

The invention is applicable primarily to chocolate and filling masses.

BRIEF DESCRIPTION OF THE DRAWINGS

A preferred embodiment of the invention will now be described with reference to the drawings in more details, in which.

BEST MODE FOR CARRYING OUT THE INVENTION

Figure 1:
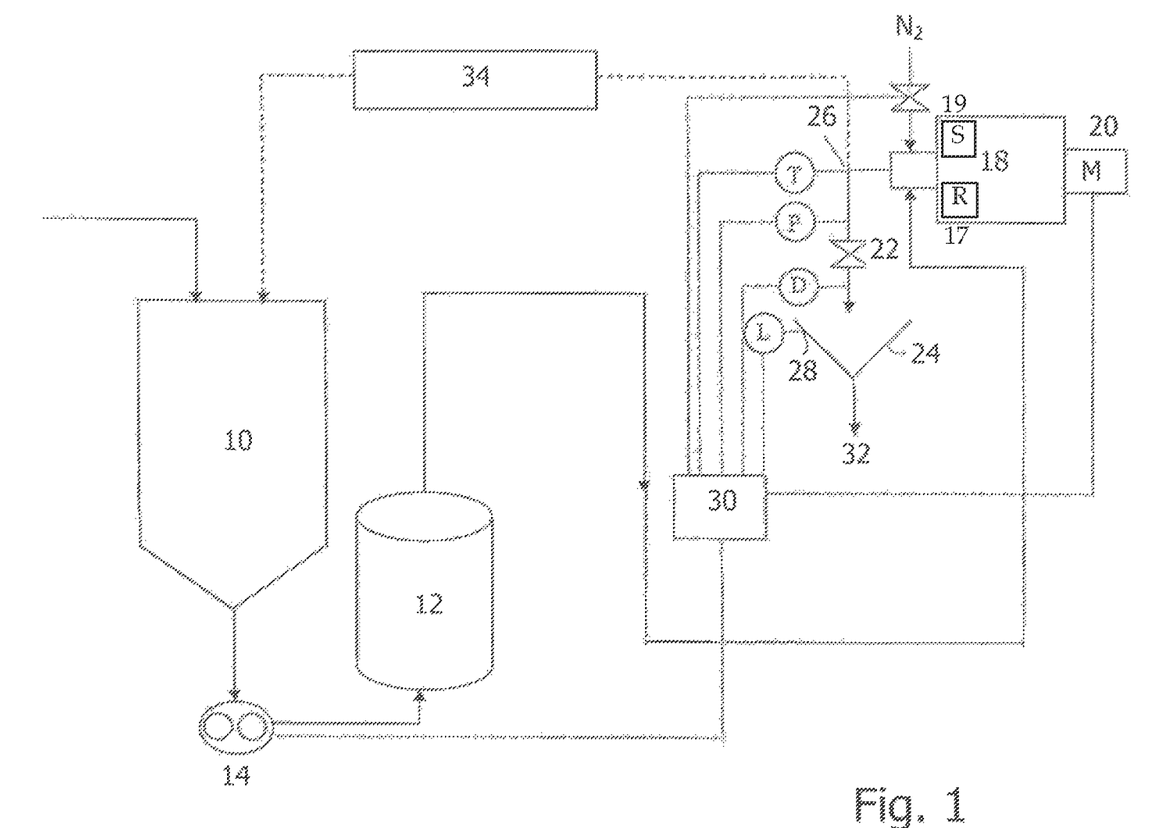
FIG. 1 shows a first embodiment of the invention.

As shown in FIG. 1 fresh chocolate mass is fed into a mass tank 10 at a temperature of about 45° C. The fresh chocolate mass is withdrawn from the bottom of the mass tank 10 and fed to a tempering unit 12 by a feed pump 14. The feed pump 14 is a positive displacement pump. The temperature of the chocolate mass is first decreased to about 27° C. and then raised to about 29 to 31° C. in the tempering unit 12. From the tempering unit the chocolate mass is fed to a micro-aeration unit 18. The micro-aeration unit 18 includes a stator 19 and a rotor 17 which is driven by a motor 20. The rotor has the form of a paddle wheel. The chocolate mass is stirred and kneaded in the micro-aeration unit 18 between the stator 19 and the rotor 17 and $N_2$ gas is added with a pressure of about 3 bar so that an aeration level of about 10% is achieved. The aerated chocolate mass is fed from the outlet 22 of the micro-aeration unit through a back-pressure regulating valve 22 into a depositor hopper 24 of a production line 32 from which the aerated chocolate mass is further processed.

A switch 26 is provided at the outlet of the micro-aeration unit 18 so that the aerated chocolate can be returned to the mass tank 10 during start-up of the system in order to drain the system. A decrystallizer 34 is arranged in this return conduit. Apart from the start-up operation, the aerated chocolate mass is not re-circulated or returned to the mass tank 10.

The depositor hopper 24 has a level detector 28. The signal of the level detector 28 indicates the demand of the production line 32. The higher the level is, the lower is the demand and vice versa. The signal of the level detector 28 is transmitted to a control unit 30 which controls the feed rate of the feed pump 14 such that the level of the confectionery mass in the depositor hopper 24 corresponds to a nominal level.

The control unit 30 controls also the pressure in the $N_2$ feed line such that the $N_2$ feed rate is proportional to the feed rate of the confectionery mass, whereby a constant aeration level in the confectionery mass delivered from the aeration device 18 is obtained.

The control unit 30 controls also the rotational speed of the rotor of the aeration unit 18 and the back-pressure adjusted by the back-pressure valve 22. These two parameters are decisive for the size of the air bubbles. A higher rotational speed of the rotor and a higher pressure in the aeration unit bring about a smaller bubble size. A higher feed rate of the feed pump 14 results in a shorter dwelling time of the confectionery mass within the aeration unit 18, which, in turn, results in a larger bubble size. A higher feed rate of the feed pump 14 has therefore to be compensated for by a higher rotational speed of the rotor and higher pressure in the aeration unit 18.

Control of the rotational speed of the rotor and of the back-pressure is preferred in order to save energy. It is possible to run the aeration device 18 continuously with the maximum rotational speed of the rotor and the maximum back-pressure, as they are necessary for a maximum feed rate of the feed pump 14. This results in an unnecessary high power consumption at lower feed rates because at lower feed rates the size of the gas bubbles will then be smaller than necessary. The size of the gas bubbles needs not to be smaller than 50 µm in order not to be visible. The smaller size of the gas bubbles does not detract from the quality of the product but is a waste of energy.

Control of the temperature is, however, important. The rotating rotator develops heat within the aeration unit. The amount of heat depends on the rotational speed of the rotor as well as on the dwelling time of the mass within the aeration unit 18, i.e. on the feed rate of the feed pump 14. The aeration unit 18 includes therefore means for controlling the temperature of the confectionery mass. The inner walls of the aeration unit 18 can include a cooling jacket or pipe through which a cooling medium like water circulates. The inlet temperature of the cooling medium and the flow rate are adjusted in order to produce the desired cooling effect. The temperature of the confectionery mass at the outlet of the aeration unit 18 is measured and transmitted to the control unit 30, which also controls the cooling equipment of the aeration unit 18.

In summary the control unit 30 constitutes a cascade control, whereas the demand of the production line 32 leads to a predetermined ratio of the gas feed rate relative to the confectionery mass feed rate. Dependent on this, the rotational speed of the rotor is adjusted. The cascade continues with an adjustment of pressure which requires changing the temperature of the cooling media adapted to the working-copy conditions.

Figure 4:
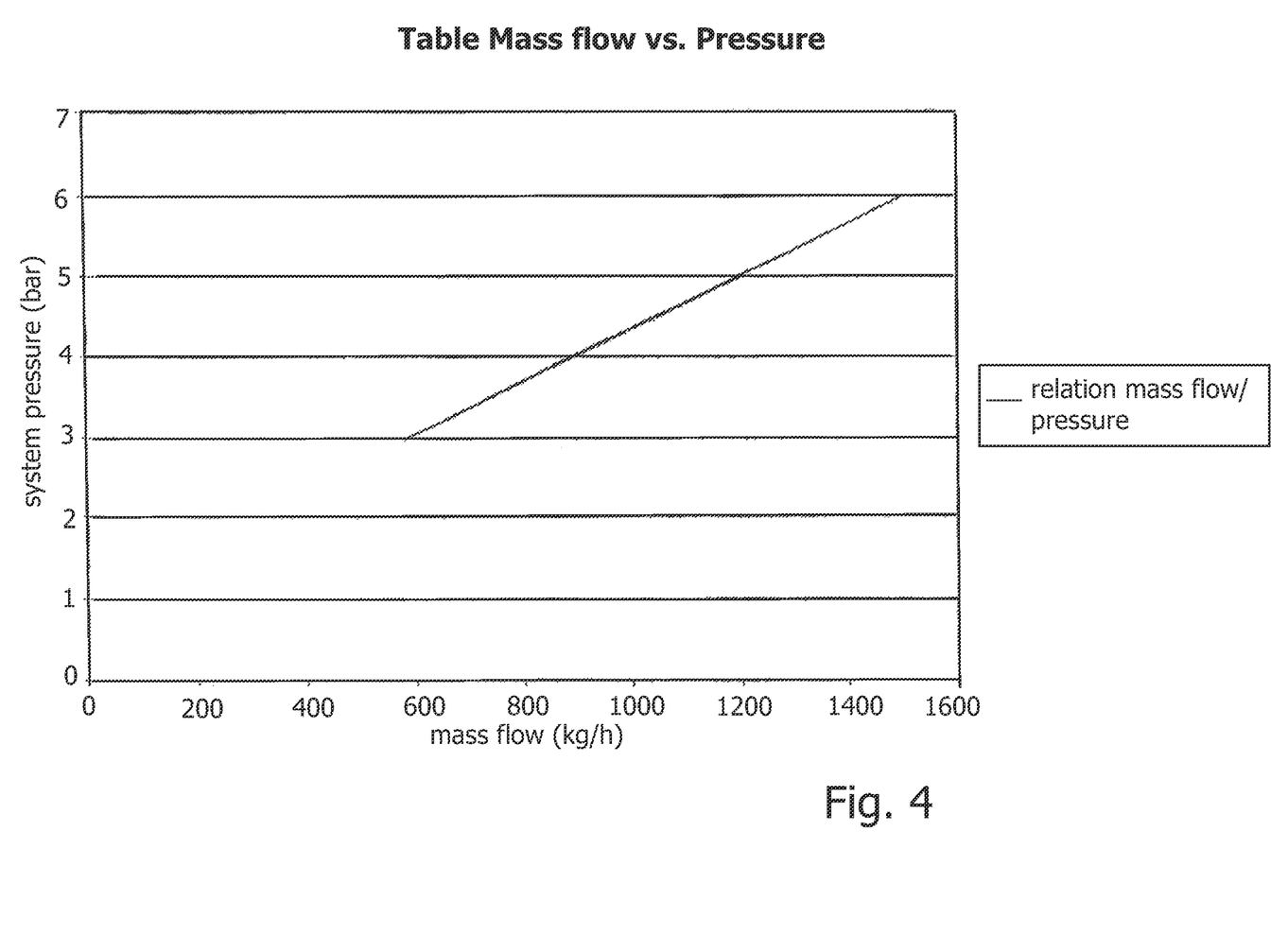
FIG. 4 shows a table of the mass flow vs. pressure.
Figure 5:
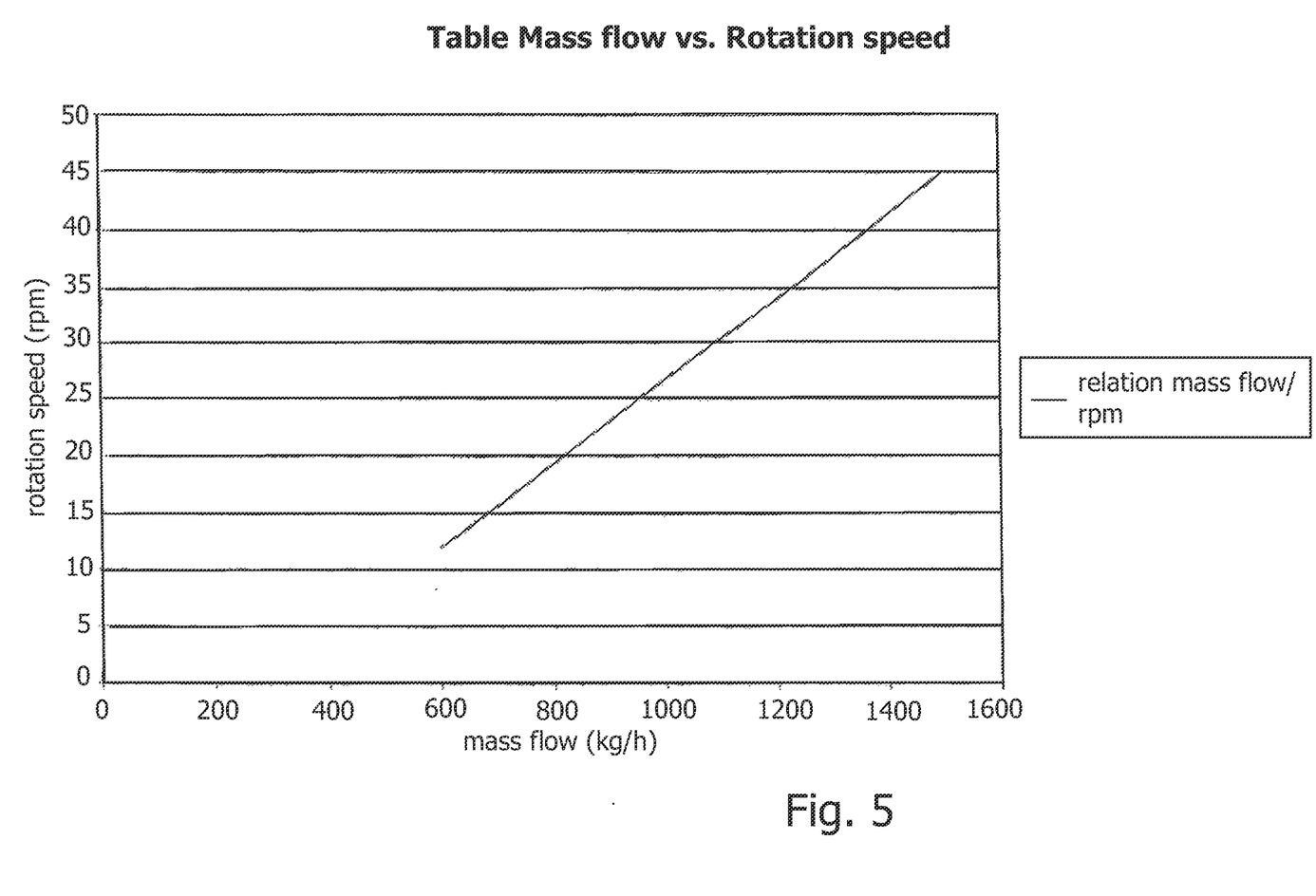
FIG. 5 shows a table of mass flow vs. rotation speed.

Aeration units 18 having suitable cooling means are inter alia the models Rotoplus 3000 and Rotoplus 1000 of Tanis Food Tec and the models T-2000 and T-750 of Trefa Continu Aerating systems. FIG. 4 and FIG. 5 show the dependency of the pressure and rotation speed respectively on the mass flow for the Aeration unit T-2000 of Trefa Continu Aerating system.

The conduits between the tempering unit 12 and the dispensing nozzle of the aeration unit 18 are temperature controlled. The temperature is controlled to maintain chocolate temperature between 28 and 31 degrees centigrade when processing chocolate mass.

Figure 2:
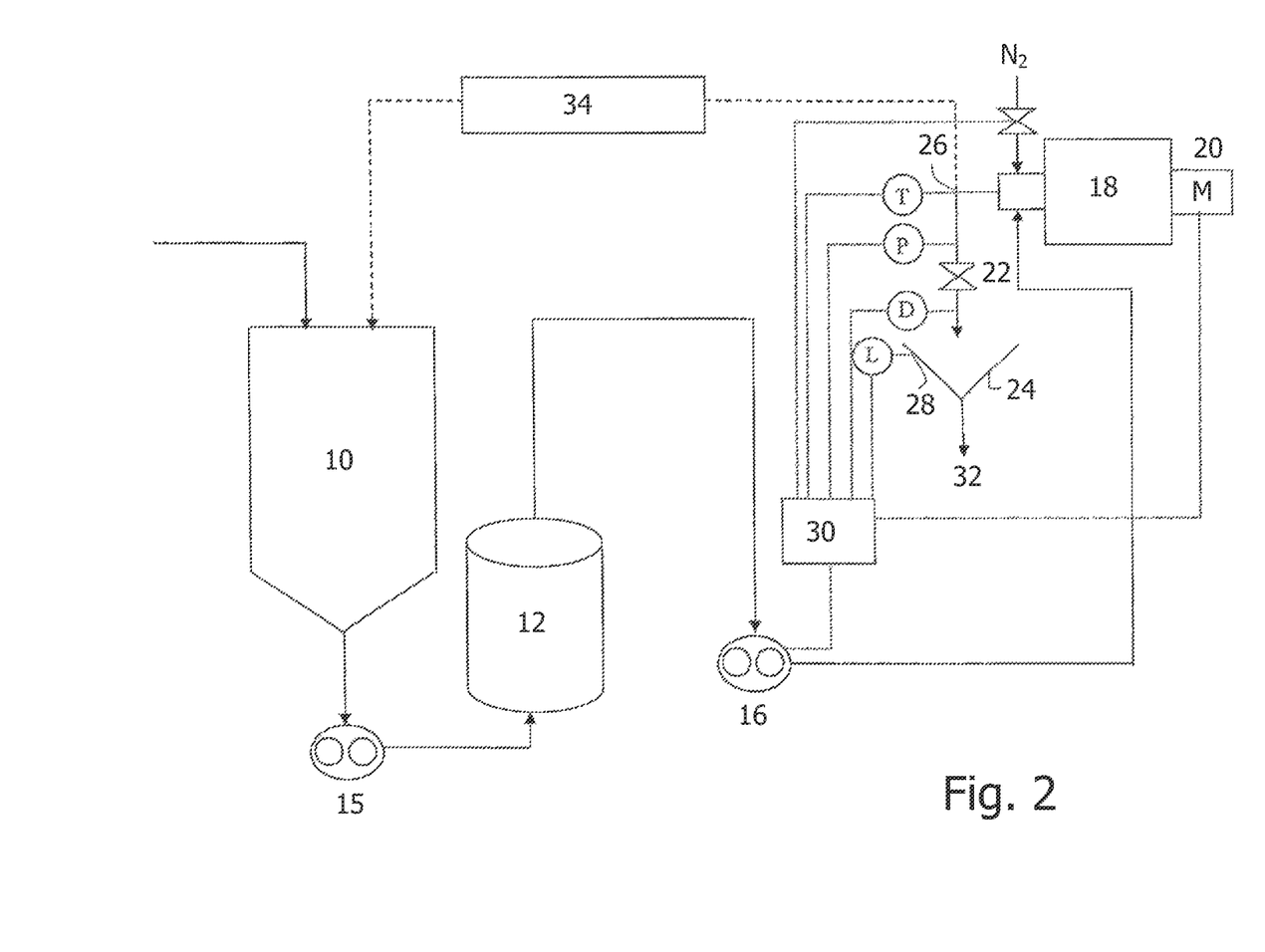
FIG. 2 shows a second embodiment of the invention.
Figure 3:
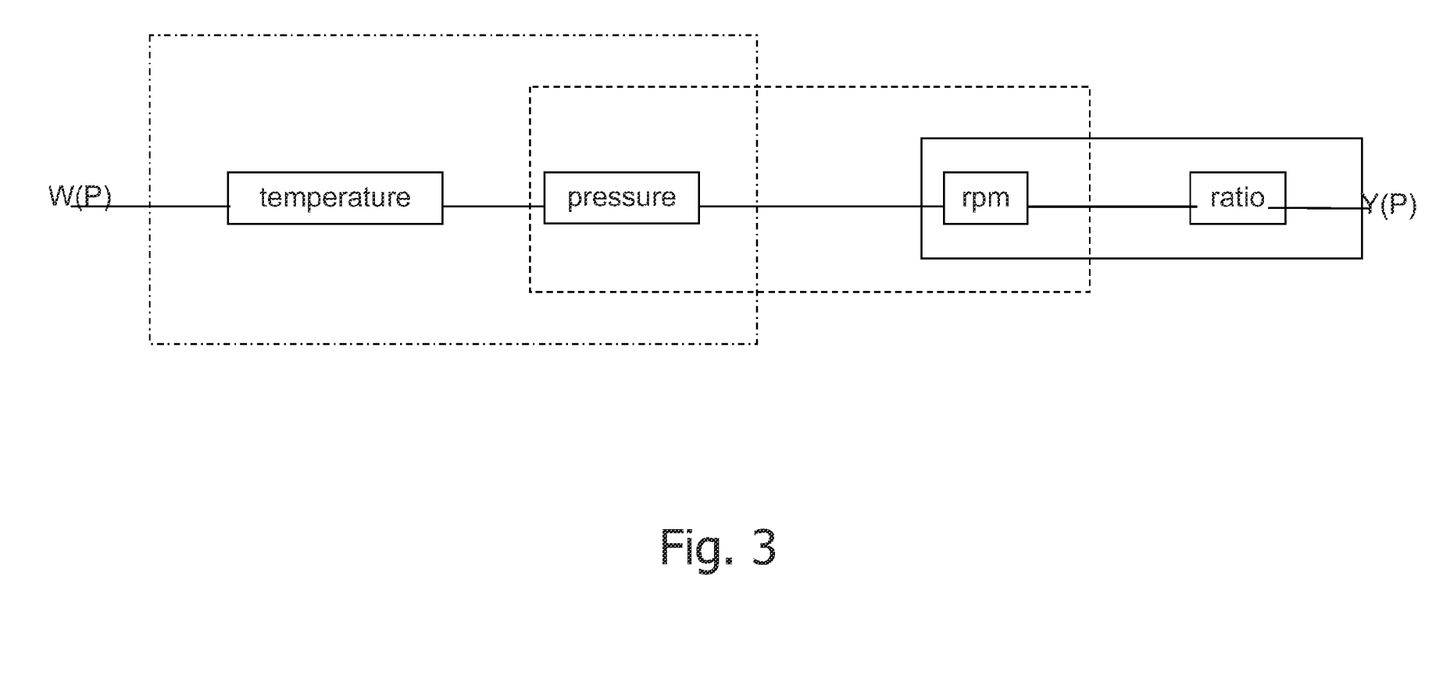
FIG. 3 shows a flow diagram of the control principle which constitutes a cascade control.

FIG. 2 shows an embodiment of the invention wherein the single feed pump 14 is replaced by a first and a second feed pump 15, 16. The first feed pump 15 is arranged between the mass tank 10 and the tempering unit 12 and the second feed pump 16 is arranged between the tempering unit 12 and the micro-aeration unit 18. The second feed pump 16 is a positive displacement pump and controlled in the same way as the single feed pump 14 of the first embodiment shown in FIG. 1.

Figure 6:
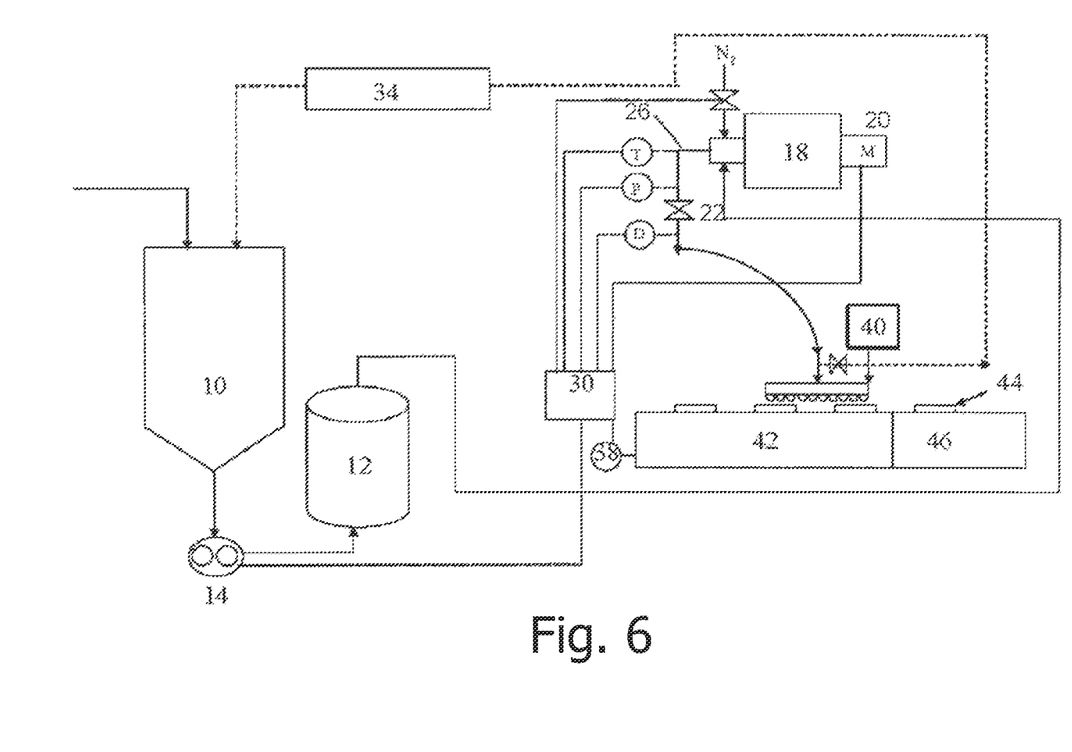
FIG. 6 shows a third embodiment of the invention and represents a variation of the first embodiment with a pressurized manifold.

FIG. 6 shows a third embodiment of the invention wherein the depositor hopper 24 of the production line is replaced by a pressurized manifold 40. The production line has a speed detector 38. The signal of the speed detector 38 indicates the demand of the production line 32. The higher the speed is, the higher is the demand and vice versa. The signal of the speed detector 38 is transmitted to a control unit 30 which controls the feed rate of the feed pump 14 such that the speed of the confectionery mass into the pressurized manifold 40 corresponds to a predetermined speed. The confectionery mass is then filled under pressure through the pressurized manifold 40 into moulds 44 which are positioned on a moulding line 42. After filling the moulds 44 with the confectionery, the moulds 44 are transported to a vibration section 46 and the moulds 44 are vibrated.

Figure 7:
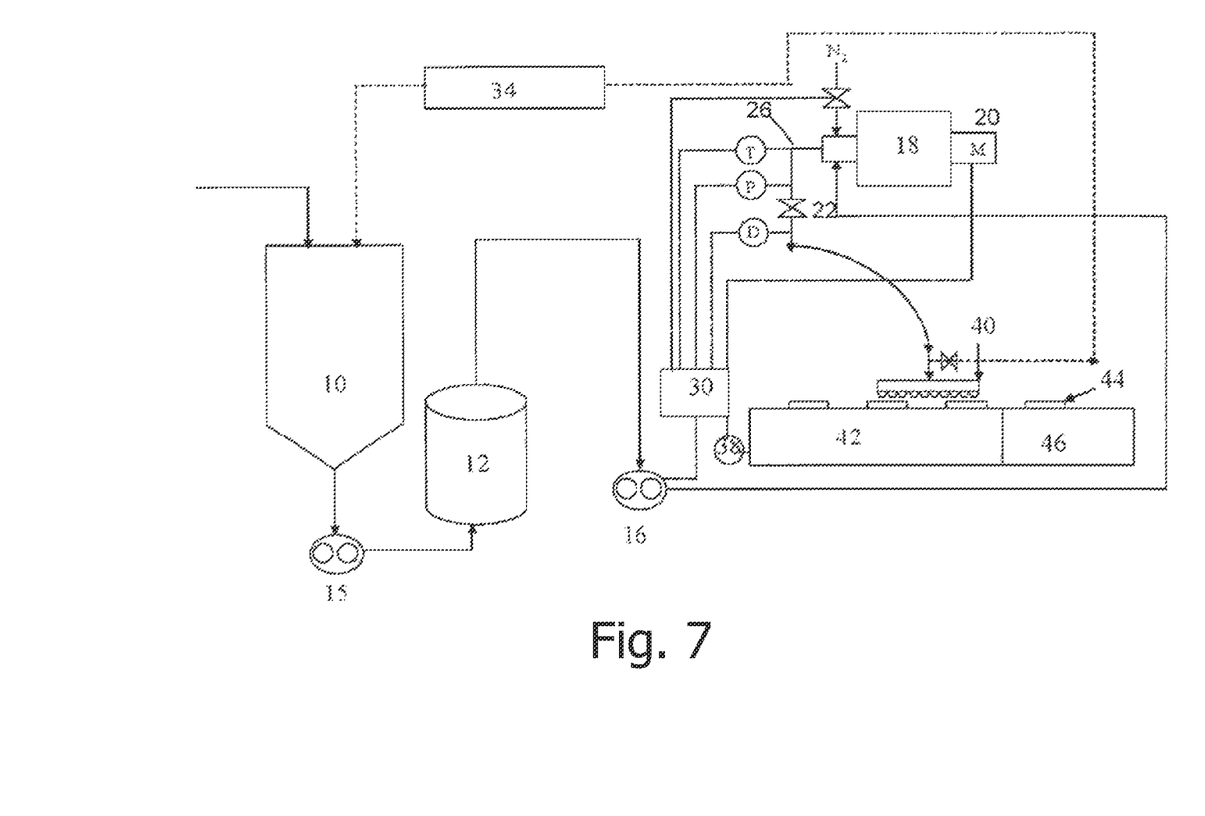
FIG. 7 shows a fourth embodiment of the invention and represents a variation of the second embodiment with a pressurized manifold.

In FIG. 7 the single feed pump 14 is replaced by a first and second feed pump 15, 16 according to the embodiment shown in FIG. 2. The depositing unit is realized by a pressurized manifold 40 in accordance to FIG. 6.

List of Reference Number 10 mass tanks
12 tempering unit
14 feed pump
15 first feed pump
16 second feed pump
18 micro-aeration unit
20 motor
22 outlet
24 depositor hopper
26 switch
28 level detector
30 control unit
32 production line
34 decrystallizer
38 speed detector
40 pressurized manifold
42 moulding line
44 mould
46 vibration section

The invention claimed is:

1. An apparatus for producing an aerated confectionary mass, the apparatus comprising:
   a supply for a raw confectionary mass;
   an aeration unit comprising a stator and a rotor wherein gas is incorporated into the confectionery mass within a space between the stator and the rotor;
   a feed pump for feeding the confectionery mass to the aeration unit at a feed rate, wherein the feed rate of the feed pump results in a dwell time of the confectionery mass in the aeration unit;
   a control unit configured to control rotational speed of the rotor in the aeration unit in response to the feed rate of the feed pump, wherein the control unit is configured to increase the rotational speed of the rotor in response to an increased feed rate and shortened dwell time of the confectionery mass in the aeration unit; and
   means for controlling temperature of the confectionery mass during aeration in the aeration unit to keep the temperature substantially unchanged.

2. The apparatus according to claim 1, the apparatus further comprising a depositor hopper with a level indicator configured to generate a signal indicating demand of the production line, wherein the aerated confectionery mass is dispensed from the aeration unit into the depositor hopper, and wherein the control unit is configured to control the feed rate of the feed pump according to the demand of the production line.

3. The apparatus according to claim 1, wherein the production line comprises a pressurized manifold through which the confectionary mass is filled into molds of a molding line under pressure.

4. The apparatus according to claim 2, wherein the rotor of the aeration unit is configured to stir and knead the confectionery mass containing the introduced gas, the rotational speed of the rotor being controlled by the control unit such that the rotational speed of the rotor is reduced for lower feed rates.

5. The apparatus according to claim 4, further comprising a back-pressure regulating valve arranged in an outlet line from the aeration unit, wherein the back-pressure generated by the valve is controlled by a control unit to enhance the back pressure for higher feed rates and to reduce the back pressure for lower feed rates.

6. The apparatus according to claim 3, wherein the rotor of the aeration unit is configured to stir and knead the confectionery mass containing the introduced gas, the rotational speed of the rotor being controlled by the control unit such that the rotational speed of the rotor is reduced for lower feed rates.

7. The apparatus according to claim 6, further comprising a back-pressure regulating valve arranged in an outlet line from the aeration unit, wherein the back-pressure generated by the valve is controlled by a control unit to enhance the back pressure for higher feed rates and to reduce the back pressure for lower feed rates.

8. An apparatus for producing an aerated confectionary mass, the apparatus comprising:
   a supply for a raw confectionary mass;
   an aeration unit comprising a stator and a rotor wherein gas is incorporated into the confectionery mass within a space between the stator and the rotor;
   a feed pump for feeding the confectionery mass to the aeration unit at a feed rate, wherein the feed rate of the feed pump results in a dwell time of the confectionery mass in the aeration unit;
   a measurer configured to measure an amount of aerated confectionery mass demanded by a production line;
   a control unit configured to (1) control the feed rate of the feed pump according to demand of the production line, (2) control the rotational speed of the rotor according to the feed rate, and (3) control the cooling power to a cooling unit so that the temperature of the confectionery mass during aeration in the aeration unit is substantially unchanged;
   wherein the control unit controls the rotational speed of the rotor and cooling power according to empirical tables, and wherein the control unit is configured to increase the rotational speed of the rotor in response to an increased feed rate and shortened dwell time of the confectionery mass in the aeration unit.

9. The apparatus according to claim 8, the apparatus further comprising a depositor hopper with a level indicator configured to generate a signal indicating the demand of the production line, wherein the aerated confectionery mass is dispensed from the aeration unit into the depositor hopper.

10. The apparatus according to claim 8, wherein the production line comprises a pressurized manifold through which the confectionary mass is filled into molds of a molding line under pressure.

11. The apparatus according to claim 9, wherein the rotor of the aeration unit is configured to stir and knead the confectionery mass containing the introduced gas, the rotational speed of the rotor being controlled by a control unit such that the rotational speed of the rotor is reduced for lower feed rates.

12. The apparatus according to claim 11, further comprising a back-pressure regulating valve arranged in an outlet line from the aeration unit, wherein the back-pressure generated by the valve is controlled by a control unit to enhance the back pressure for higher feed rates and to reduce the back pressure for lower feed rates.

13. The apparatus according to claim 10, wherein the rotor of the aeration unit is configured to stir and knead the confectionery mass containing the introduced gas, the rotational speed of the rotor being controlled by a control unit such that the rotational speed of the rotor is reduced for lower feed rates.

14. The apparatus according to claim 13, further comprising a back-pressure regulating valve arranged in an outlet line from the aeration unit, wherein the back-pressure generated by the valve is controlled by a control unit to enhance the back pressure for higher feed rates and to reduce the back pressure for lower feed rates.

15. An apparatus for producing an aerated confectionary mass, the method comprising:
   a supply for a raw confectionary mass;
   an aeration unit;
   a feed pump for feeding the confectionery mass to the aeration unit at a feed rate, wherein the feed rate of the feed pump results in a dwell time of the confectionery mass in the aeration unit;
   a gas injector for injecting a gas into the aeration unit;
   a rotor disposed within the aeration unit for kneading the confectionary mass and dispersing the gas throughout the confectionary mass in the form of gas bubbles;
   a control unit configured to control (1) a feed rate of the feed pump according to a demand of a production line that is indicated downstream of the aeration unit, (2) a rotational speed of the rotor according to the feed rate, and (3) cooling power to a cooling unit according to rotational speed of the rotor; and
   a level detector downstream of the aeration unit, the level detector configured to send a signal to the control unit indicating a demand of the production line, the control unit being configured to control the feed rate of the feed pump in response to the signal of the level detector;

wherein the control unit is programmed to adjust the feed rate, rotational speed of the rotor, and cooling power to meet the demand of the production line while maintaining the size of all of the gas bubbles below about 50 μm, and wherein the control unit is configured to increase the rotational speed of the rotor in response to an increased feed rate and shortened dwell time of the confectionery mass in the aeration unit.

16. The apparatus according to claim 15, wherein the control unit enhances rotational speed of the rotor in response to increases in demand and feed rate according to empirical tables and reduces rotational speed of the rotor in response to decreases in demand and feed rate according to empirical tables.

17. The apparatus according to claim 15, further comprising a back-pressure regulating valve arranged in an outlet line from the aeration unit, wherein the back-pressure generated by the valve is controlled by a control unit to enhance the back-pressure for higher feed rates and to reduce the back-pressure for lower feed rates.

18. The apparatus according to claim 15, the apparatus further comprising a depositor hopper downstream of the aeration unit, and the depositor hopper includes the level indicator.

\* \* \* \* \*